May 17, 1966 A. KORPEL 3,252,159

WAVE-SIGNAL APPARATUS RESPONSIVE TO PHASE PATTERN INFORMATION

Filed Jan. 29, 1964 2 Sheets-Sheet 1

INVENTOR.
Adrianus Korpel
BY Hugh S. Drake
Atty.

May 17, 1966 A. KORPEL 3,252,159

WAVE-SIGNAL APPARATUS RESPONSIVE TO PHASE PATTERN INFORMATION

Filed Jan. 29, 1964 2 Sheets-Sheet 2

INVENTOR.
Adrianus Korpel
BY
Hugh S. Drake
Atty.

United States Patent Office 3,252,159

Patented May 17, 1966

3,252,159

WAVE-SIGNAL APPARATUS RESPONSIVE TO PHASE PATTERN INFORMATION

Adrianus Korpel, Prospect Heights, Ill., assignor to Zenith Radio Corporation, a corporation of Delaware Filed Jan. 29, 1964, Ser. No. 340,953
24 Claims. (Cl. 343—5)

This invention pertains to wave-signal apparatus. More particularly, it pertains to apparatus embodied as wave-signal receivers and as equipment for determining characterstics of a spaced object. Typifying the latter is a radar transceiver.

Of interest to the invention is an oscillator which develops oscillations at a predetermined frequency in either of two counterphases dependent upon the phase of initial oscillations. One known form of such an oscillator is a network containing a varactor diode which is excited or pumped at a given frequency. The network develops sub-harmonic oscillations at a frequency one-half that of the pump frequency. This sub-harmonic oscillation can exist in only two mutually opposite phases with respect to the pump frequency. The ultimate phase is determined by the initial circuit conditions at the beginning of the oscillations. By injecting a synchronizing signal of the same frequency as that of the sub-harmonic oscillations, the network can be caused selectively to oscillate in either one of the two possible phases. Such networks have been used for their bistable properties as a logical element in electronic computers.

It is also known to utilize varacter or parametric sub-harmonic oscillators in the super-regenerative mode of operation wherein the oscillations are periodically interrupted and then allowed to build up again. In this mode of operation, the synchronizing signal required at the beginning of oscillation is very small, having an amplitude comparable to the existing circuit noise. Since the noise may be made small in a parametric circuit, the device is usable, in combination with hybrid mixers to convert pulse script to phase script and vice versa, as a very sensitive radio-frequency pulse amplifier and restorer. Weak or distorted pulse script is converted to phase script, amplified in a super-regenerative sub-harmonic oscillator quenched in synchronism with the pulses, and then converted back to pulse script for subsequent utilization.

It is a general object of the present invention to utilize the kind of oscillator network discussed above in combination with other elements to provide new and improved wave-signal apparatus.

It is another object of the present invention to provide apparatus of the above character which functions as a new and improved wave-signal receiver.

A further object of the present invention is to provide a new and improved transceiver for use in determining the characteristics of the spaced objects, as in radar.

In accordance with the invention, wave-signal apparatus comprises an oscillator which develops oscillations at a predetermined frequency in either of two counterphases dependent upon the phase of initial oscillations together with means coupled to the oscillator for periodically quenching the oscillations. Coupled to the oscillator are means for supplying oscillatory energy thereto and means for extracting and detecting energy contained in a sub-sideband of the spectrum of the quenched oscillations.

As embodied more particularly in a wave-signal receiver, the oscillator is supplied with oscillatory energy having a frequency $f+\Delta f$, and the extracted and detected energy is contained in a sub-sideband of the spectrum of the quenched oscillations at a frequency $f \pm nf_q$ to develop an output signal having a frequency $N\Delta f$, where $f$ is the oscillation frequency, $f_q$ is the quench frequency, $n$ is any integer including zero, and N is an integer. In an embodiment for determining charcteristics of a spaced object, signal-transmission means coupled to the oscillator translates energy from the oscillations between the oscillator and the object. The oscillator is quenched to establish an oscillatory pulse duration $T_d$ with a quench period $T_q$ such that $NT_q—T_d$ is less than $\tau$ which in turn is less than $NT_q$, where $\tau$ is the echo delay time of the oscillations between the signal-transmission means and the object and where N is an integer. Coupled to the oscillator in this combination are means for extracting and detecting sideband energy in the spectrum of the quenched oscillations.

The features of the present invention which are believed to be novel are set forth with particularity in the appended claims. The organization and manner of operation of the invention, together with further objects and advantages thereof, may best be understood by reference to the following description taken in connection with the accompanying drawings, in the several figures of which like reference numerals identify like elements, and in which:

FIGURE 1 is a schematic diagram of one embodiment of the present invention;

FIGURE 1*a* is a schematic diagram of an alternative form of a portion of the arrangement of FIGURE 1;

Figure 6:
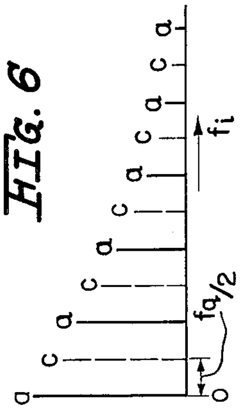
Figure 2:
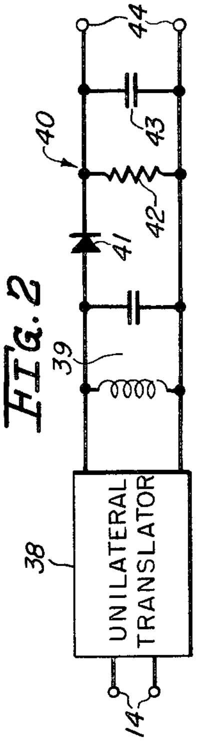
FIGURE 2 is a schematic diagram showing in more detail a portion of the arrangement of FIGURE 1.
Figure 4:
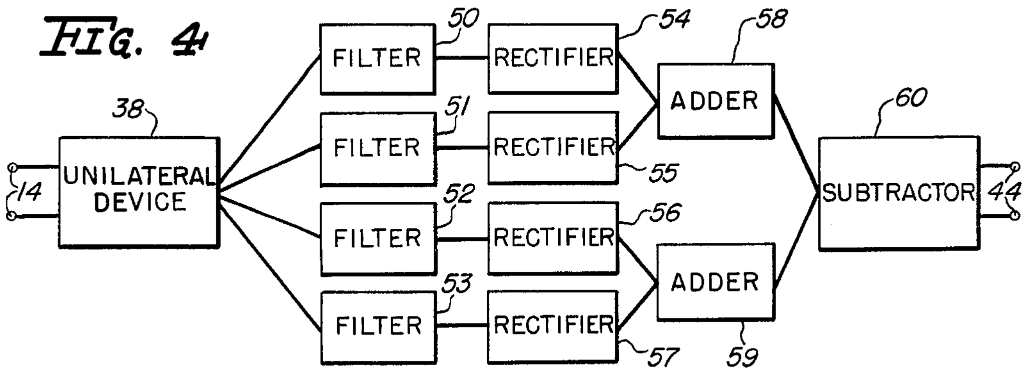
Figure 5A:
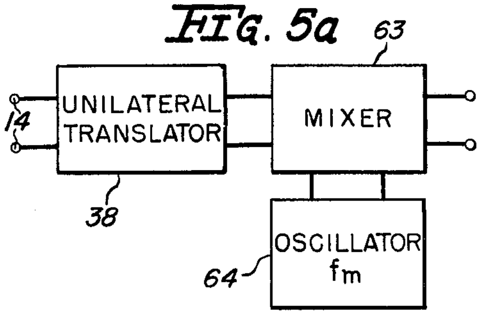
Figure 5B:
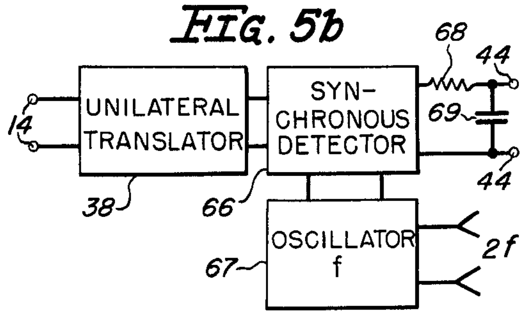
Figure 7:
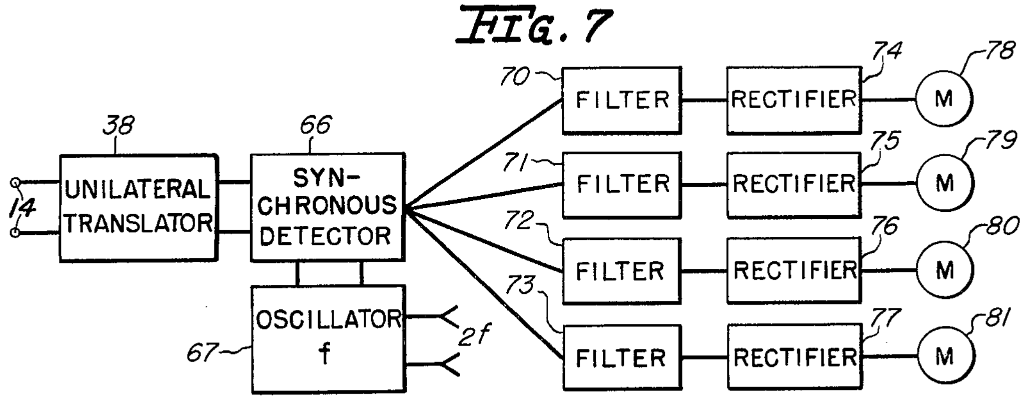
Figure 8:
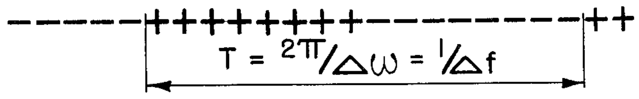
Figure 9:
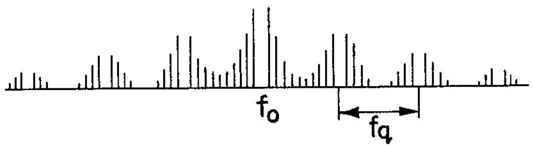

FIGURES 4, 5*a* and 5*b* individually comprise a diagram of a network alternative to that shown in FIGURE 2;

FIGURE 6 depicts the spectrum of oscillatory energy present in a portion of the network diagrammed in FIGURE 5*b*;

FIGURE 7 represents still another alternative apparatus arrangement for use with the invention;

FIGURE 8 depicts in phase script a condition of operation of the apparatus shown in FIGURE 7; and FIGURE 9 depicts the frequency spectrum of oscillations present in the apparatus of FIGURE 7.

Figure 1:
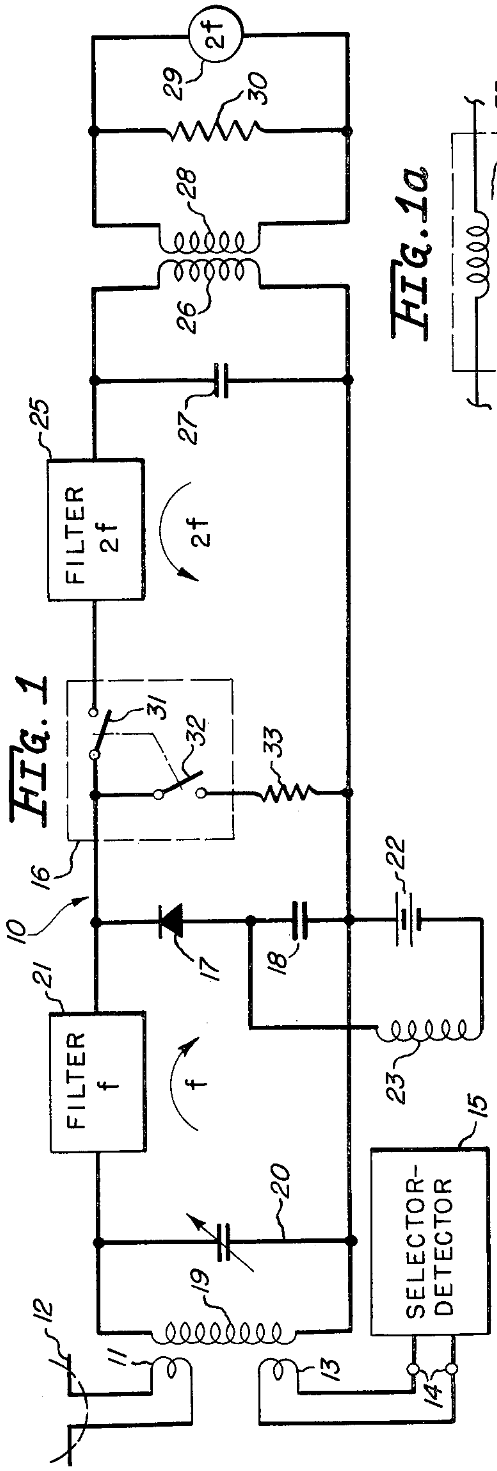

As shown in FIGURE 1, a parametric sub-harmonic oscillator 10 has an input coil 11 coupled to an antenna 12 and an output coil 13 connected to a pair of output terminals 14, in turn, coupled to a selector-detector 15. Oscillator 10 further includes a quenching device 16 which periodically quenches oscillations developed in the network. With oscillator 10 developing oscillatory energy at a predetermined signal frequency $f$, the oscillations in any given quench cycle may be in either of two counterphases, dependent upon the phase of initial oscillations, that is, the phase conditions at the start of the conductive interval of each quench cycle. Oscillatory energy supplied to the oscillator from antenna 12 is capabale of establishing the particular one of the two counterphases which occurs. When so operating, the selector-detector 15 functions to extract and detect energy contained in a sideband of the spectrum of the quenched oscillations.

In more detail, the oscillatory-signal circuit of oscillator 10 includes, in series combination, a varactor diode 17, a bypass capacitor 18, a tank circuit composed of an inductor 19 tuned to frequency $f$ by a parallel connected capacitor 20 supplementing the capacitance of diode 17, and a narrow-band filter 21 having an acceptance band to pass the signal-frequency $f$. Varactor diode 17 is energized from a unidirectional potential source 22 connected across capacitor 18 through a radio frequency choke 23.

Also included in oscillator 10 is a pump-signal network which includes, in series combination, varactor diode 17, a narrow-band filter 25 having an acceptance band to pass the pump signal at a frequency $2f$, a tank circuit tuned to the pump frequency and comprising an inductor 26 in parallel with a capacitor 27, and capacitor 18. The capacitance of diode 17 is also part of the tuned circuit. The pump signal is delivered to the oscillator network from a coil 28 coupled to coil 26 and across the pump source 29 having a source resistance 30.

As illustrated in FIGURE 1, quenching device 16 is represented by a switch 31 connected in series between filter 25 and the varactor diode together with a switch 32 and a resistor 33 connected in series with switch 32 across the series combination of varactor 17 and capacitor 18. Switches 31 and 32 are ganged so that switch 32 is open when switch 31 is closed to enable the delivery of the pump signal to varactor diode 17; when switch 32 is closed to form a resistive shunt across the leg of the network including diode 17, switch 31 is open. In operation, switches 31 and 32 are opened and closed at the quenching rate or quench frequency $f_q$. When switch 31 is closed, oscillations at frequency $f$ are produced by the action of diode 17 in response to the pump signals from source 29. When switch 31 is opened and switch 32 closed, the pump signals are removed and resistor 33 serves to damp out or quench the signal oscillations in the circuit.

Figure 1A:
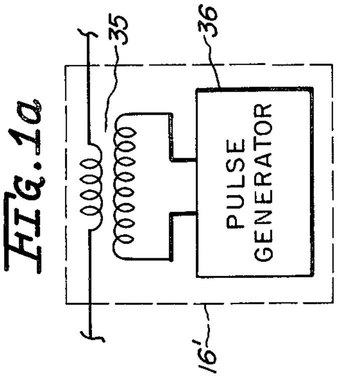

In practice, quenching device 16 may take the form of diode switches provided in either a wave guide or coaxial line system. A simple and very effective quenching device 16' is illustrated in FIGURE 1*a*. The primary winding of a transformer 35 is substituted in place of switch 31 in FIGURE 1, in series between filter 25 and the cathode of diode 17. The secondary of transformer 35 is coupled across a quenching pulse generator 36. In operation, pulse generator 36 injects current into the oscillator circuit through the varactor diode, the pulses serving to periodically bias the diode conductively and thereby quench the oscillations.

Except for selector-detector 15, oscillator 10 as thus far described is of known structure and operation. Its manner of operation, including that of quenching device 16' shown in FIGURE 1*a*, is fully described, with respect to an embodiment in a different kind of system, in U.S. Patent 2,977,482 issued March 28, 1961, in the name of Fred Sterzer.

In one general embodiment of the present invention, oscillator 10 serves as part of a radar transceiver capable of providing both distance information and speed information with respect to an object spaced away from the transceiver. In this application, antenna 12 serves both to radiate oscillatory energy from oscillator 10 to the distant object and to receive the echo of that energy back from the object and feed it into the circuit of oscillator 10 to synchronize or control the phase of the oscillations upon their initiation in each quenching period.

Turning first to the determination of information pertaining to the speed of movement of the object under surveillance, selector-detector 15 may take the form shown in FIGURE 2, which includes a unilateral translator or one-way device 38, a narrow-band filter 39 and a rectifier 40. One-way device 38 serves to prevent oscillator 10 from self-locking by virtue of back-feeding of energy to cause carry-over from one quench cycle to the next; it may take any such known form as an electron tube or ferrite isolator and is located between the oscillator circuit and filter 39. As shown, filter 39 is the parallel combination of an inductor and a capacitor connected across the output leads from device 38. Rectifier 40 includes a diode 41 in series with one of the output leads of device 38 together with a resistor 42 and a capacitor 43 connected across the output leads on the output side of rectifier diode 41 and between the latter and output terminals 44.

As will become apparent, the frequency of the signal appearing across output terminals 44 is representative of the speed of the object returning echo signals to antenna 12. Consequently, a frequency meter connected across terminals 44 may be calibrated directly in terms of speed of the object. On the other hand, any of the various known radar systems alternatives may be employed, such as displaying the output signal on a visual indicator, feeding the output signal to other apparatus designed to provide an ultimate indication representative of target or object speed compensated for the movement of a vehicle in which the transceiver under discussion is located, so as to allow for relative motion, or feeding the signal to an associated fire-control gear, for example.

As indicated above, the sub-harmonic oscillation of oscillator 10, at frequency $f$, is utilized as the transmitted radar signal and the radar echo is employed as the synchronizing signal in the super-regenerative mode of operation. Consequently, the oscillator locks itself in by means of the radar-echo feedback path. To understand the manner in which the transceiver locks itself in terms of phase, assume that the echo-time is shorter than one pulse repetition period as established by the quency frequency. With the object stationary relative to the transceiver, the phase of each transmitted pulse is determined by the phase of the preceding received pulse, which in turn is determined by the phase of the preceding transmitted pulse modified by the feedback path. Consequently, the phase relationship between adjacent transmitted pulses is determined by the feedback path. Denoting the two possible phases by + and —, when there is no phase reversal in the feedback path one of the following transmitted pulse patterns may exist:

(*a*) + + + + + + + + +
(*b*) — — — — — — — — —

Whether the condition denoted by (*a*) or (*b*) exists depends on the phase of the first transmitted pulse, which in turn depends upon the initial circuit noise.

When there is a phase reversal in the feedback path, one of the following two patterns, essentially of the same form, may exist:

(*c*) + — + — + — + —
(*d*) — + — + — + — +

Again, and still assuming a stationary object, whether the condition represented by (*c*) or (*d*) exists depends upon the phase of the first transmitted pulse.

Of primary significance to the present embodiment, a relatively moving object will create a resulting pulse pattern which changes periodically. The echo from the moving object changes repeatedly between the condition illustrated by phase script patterns (*a*) or (*b*) to (*c*) or (*d*), respectively. The rate of change between the two patterns equals the Doppler frequency of the moving object, and it is this information contained in the total pulse pattern which is extracted to provide an indication of relative speed.

When the echo delay time is longer than one pulse repetition period, but shorter than two such periods, the first two pulses in the stationary pattern are arbitrary. Consequently, one of eight possible pulse patterns may exist. Without feedback phase reversal, the pulse patterns, in phase script, are:

(*e*) + + + + + + + + +
(*f*) — — — — — — — — —
(*g*) + — + — + — + —
(*h*) — + — + — + — +

With phase reversal in the feedback path, the pulse patterns are one of the essentially like forms:

(*i*) + + — — + + — — + + —
(*j*) — — + + — — + + — — +
(*k*) + — — + + — — + + — — +
(*l*) — + + — — + + — — + + —

When the object is moving relative to antenna 12, the pattern again changes periodically, this time from the patterns of (*e*), (*f*), (*g*) or (*h*) to (*i*), (*j*), (*k*) or (*l*), respectively. As before, the total pulse pattern includes Doppler frequency in formation which, in the present embodiment, is extracted in the network of FIGURE 2.

Similar pulse pattern conditions can be shown to exist for longer echo delay periods. In general, the pulse patterns become more complicated, but they always contain a periodic change of pattern which is representative of a Doppler frequency term caused by the moving object, at least provided that the object returns a stronger echo than that from surrounding fixed objects.

With an echo time delay $\tau$, a pulse repetition period $T_q$ and a pulse duration $T_d$, the transceiver is in a phase-locked condition when:

$$NT_q - T_d < \tau < NT_q \qquad (1)$$

where N is an integer. This relationship establishes certain lock-in zones characterized by the assignment of different integers for N.

For simplicity, the most useful application of the foregoing lies in the case of the first lock-in zone, where the phase of each pulse is determined by the phase of the preceding one and the length of the feedback path. This results in a transmitted pulse pattern of the form depicted in phase script by (*a*), (*b*), (*c*) and (*d*) above. As between (*a*) and (*c*) or between (*b*) and (*d*), the conditions are equivalent since only the sign is changed. A change of one-fourth wavelength in the position of the object will change the pulse train from that of pattern (*a*) into that of pattern (*c*) (or vice versa) and the pulse train will change from (*c*) back to (*a*) after a change in position of another one-fourth wavelength. It follows, therefore, that if the velocity of the object is denoted $V_t$, the basic pattern repetition frequency $f_d$ of either pattern (*a*) or (*c*) [or in the equivalent case, (*b*) or (*d*)] is determinable from the following relationship:

$$f_d = \frac{2V_t}{\lambda} = 2 \cdot \frac{V_t}{V_p} \cdot f_o \qquad (2)$$

where $V_p$ is the phase velocity of wave propogation, $f_o$ is the oscillator radian frequency, and $\lambda$ is the wavelength of the oscillator frequency.

To now analyze the manner in which the repetition or Doppler frequency $f_d$ is derived, assume for the following discussion that this frequency is small compared to the quench frequency $f_q$. This means that the time taken by the object to move one-fourth wavelength is large compared with the repetition period (quench period) of the pulses.

Figure 3:
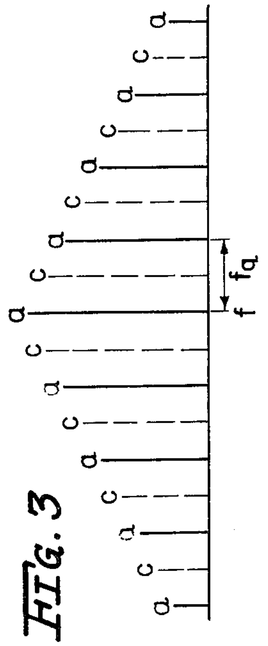
FIGURE 3 represents the spectrum of oscillations developed by the apparatus of FIGURE 1.

FIGURE 3 illustrates the frequency spectrum of the oscillatory energy developed in oscillator 10, the carrier at frequency $f$ being modulated by a pulse pattern periodically changing between the patterns depicted in phase script Equations *a* and *c*. Thus, the overall sideband of the carrier frequency is composed of a plurality of subsidebands which contain Doppler frequency information. The spectrum of phase pattern (*a*) is represented by the solid spectral lines labeled "*a*" and those of the phase pattern (*c*) are represented by the dashed spectral lines labeled "*c*". As indicated, the spectral lines of each pattern are spaced apart by the quench frequency $f_q$. The actual shape of the transmitted pulses effects only the spectrum envelope and does not change the position of the spectral lines.

As discussed above, upon movement of the object relative to the transceiver the spectrum changes between spectral patterns (*a*) and (*c*) at the Doppler frequency established by the object motion. This change is apparently not gradual but occurs in discrete intervals. That is, for nearly half of the Doppler period pattern (*a*) will exist and for the other half, pattern (*c*). In between the two patterns there is a period in which the receiver is not locked and a random pulse train is generated. The duration of this pulse train depends upon the strength of the return signal and the sensitivity of the receiver. The noise spectrum of such a random pulse train would consist of a continuous spectrum around the carrier frequency $f$ and of the same shape as the spectrum belonging to patterns (*a*) and (*c*).

In the apparatus of FIGURE 2 combined with that of FIGURE 1, the Doppler frequency is extracted by feeding the resultant oscillatory signal in oscillator 10 through unilateral translator 38 to narrow-band filter 39 which is tuned to any of the spectral lines indicated in FIGURE 3. The bandwidth of the filter preferably is smaller than the quench frequency but yet large enough to contain the highest Doppler frequency for which the apparatus is designed to receive; this, of course, is a function of the kind of object for which speed determination is desired. The filter, therefore, is tuned to a frequency $f_1$ in accordance with the relationship:

$$f_1 = f \pm n \cdot f_q/2 \qquad (3)$$

where $n$ is any integer and represents the particular order of the spectral line selected. Consequently, filter 39 in FIGURE 2 acts to extract a subsideband of the quenched oscillations. Subsequent rectification of the subsideband energy by rectifier 40 yields a demodulated signal which represents the basic Doppler frequency. As indicated hereinbefore, this Doppler frequency signal as it appears at terminals 44 may be fed to a meter calibrated directly in terms of speed, or it may be otherwise processed further.

In order to increase the signal-to-noise ratio to a value greater than that obtainable even with optimum design in that respect of filter 39 in FIGURE 2, it is preferred to employ a plurality of additional filters individually assigned to different ones of the various spectral lines or subsidebands, subsequently matrixing the combined rectified outputs. To this end, the network of FIGURE 4 is substituted for that of FIGURE 2 in the combination with the device of FIGURE 1. This network includes unilateral device 38 coupled to terminals 14 as before. The output signal from device 38 is fed in parallel to a plurality of narrow-band filters individually having acceptance bands at respective ones of the different subsidebands in the spectrum of the quenched oscillations.

As illustrated, the network of FIGURE 4 includes filters 50, 51, 52 and 53 coupled at their inputs to device 38 and each feeding an individual rectifier 54, 55, 56 and 57, respectively. Rectifiers 54 and 55 have their demodulated output signals fed to an adder 58, while rectifiers 56 and 57 feed on adder 59. The combined demodulated signals from adders 58 and 59 are subtracted in a subtractor 60 from which an ultimate signal is fed to output terminals 44.

The filters, in this instance 50 and 51, feeding adder 58 are tuned to individually different quench-frequency subsidebands as determined in accordance with the relationship:

$$f_1' = f \pm n f_q \qquad (4)$$

where $n$ is any integer. The filters, such as 52 and 53, which feed the other adder are tuned to different half-quench-frequency subsidebands according to the relationship:

$$f_1'' = f \pm n \cdot f_q/2 \qquad (5)$$

where $n$ in any odd integer. Consequently, the combined rectifier outputs from the different spectral lines corresponding to phase pattern (*a*) (FIGURE 3) have their rectifier outputs combined and subtracted from the combined rectified output of the filters tuned to the different ones of the (*c*) spectral lines. As the total number of filters is increased, the signal-to-noise ratio in turn is increased, the optimum being provided by respective comb filters covering all of the significant (*a*) and (*c*) spectral lines, with subtraction of the rectified outputs of the two comb filters to provide the output signal.

The filter networks shown in either FIGURE 2 or FIGURE 4 may be preceded by a heterodyning process such that the spectral lines appear at respective intermediate frequencies. In this case, an IF frequency $f_1$ takes the place of the original oscillator frequency $f$ in FIGURE 3, and the two different sets of filters for use in the FIGURE 4 embodiment are tuned respectively to the frequencies:

$$f_1'=f_1\pm nf_q \qquad (6)$$

where $n$ is any integer, and $$f_1''=f_1\pm n\cdot f_q/2 \qquad (7)$$

where $n$ equals 1, 3, 5, etc. To this end, unilateral translator 38 in FIGURE 5*a* is followed by a mixer 63 in which the various different signal frequencies within the spectrum of the oscillatory energy at the output of translator 38 are beat with a mixing signal from an oscillator 64 to produce at the output of mixer 63 the intermediate frequencies which then are fed to the filter-rectifier network of FIGURE 4. Alternatively, the network of FIGURE 2 may be used with filter 39 satisfying Equation 7 for any integer $n$.

As a limit to the use of an intermediate frequency, the frequency $f_1$ may become zero. This constitutes synchronous detection of the oscillator signal by mixing it with the same frequency, in fixed phase, and integrating the resultant detected signal over a time period long compared to the oscillator signal. The spectrum of the synchronously detected output signal is shown in FIGURE 6 for the above assumed pulse patterns (*a*) and (*c*). When utilizing a synchronous detector, the subsidebands may be extracted and subsequently detected by the technique illustrated in FIGURE 2 by utilizing a narrow-band filter tuned to one of the subsidebands or as in FIGURE 4 with a plurality of filters and matrixing. However, it is preferred to obtain the effect of a narrow-band filter lcoated at an extraction frequency of zero simply by synchronously detecting and utilizing a detector time constant which is larger than the quench period but smaller than the smallest Doppler period to be detected.

A typical synchronous detector arrangement for this purpose is depicted in FIGURE 5*b* wherein unilateral translator 38 feeds an input of synchronous detector 66 to which a second input is received from a local oscillator 67 which develops signals having the same oscillator frequency $f$ as that of oscillator 10, and of fixed phase with respect thereto. The signal output of synchronous detector 66 is fed to output terminals 44 through an integration network composed of a series resistor 68 and a shunt capacitor 69. As stated, its time constant is longer than the quench period and smaller than the minimum Doppler period. Most simply, oscillator 67 may be another oscillator of the form of oscillator 10 shown in FIGURE 1 and in which precise phase correspondence is maintained by the simple expedient of pumping it with pump source 29 which also pumps oscillator 10.

In accordance with another aspect of the present invention, information pertaining to distance of the remote object is obtained by extracting and detecting the lowest quench frequency subharmonic present in the developed pulse pattern. It was pointed out with respect to Equation 1 that different lock-in zones are established, as represented by values of $N=$1, 2, 3, etc. When an echo is received which is characterized by a condition of $N=K$, the ensuing pulse pattern contains, in addition to the Doppler frequency information discussed, the 2Kth subharmonic of the pulse repetition rate. Extraction of this subharmonic yields distance information by indicating which lock-in zone has been established.

An embodiment capable of deriving the distance information is depicted in FIGURE 7, in which the network there illustrated is coupled to oscillator 10 at terminals 14 (FIGURE 1). The signal oscillations are fed through unilateral translator 38 to synchronous detector 66 supplied with a local oscillator signal preferably from another subharmonic parametric oscillator pumped from source 29 as in the case of the circuit in FIGURE 5*b*. In this case, however, a plurality of narrow-band filters 70, 71, 72 and 73 are tuned respectively to frequencies in the spectrum of the oscillations at $f_q/2$, $f_q/3$, $f_q/4$, etc. with the lowest frequency filter being tuned to the lowest quench frequency subharmonic to be expected, depending on the particular application intended, while filters 70, 71 and 72, no matter what is their actual number, are tuned to each of the higher order quench frequency subharmonics. As a general equation for using any number of filters, the individual filters are tuned to a frequency $f_1'''$ determined in accordance with the relationship:

$$f_1'''=f_q/n \qquad (8)$$

where $n$ is any integer.

In the specific example in FIGURE 7, the different quench frequency subharmonics from filters 70–73 are individually rectified by rectifiers 74–77, respectively. The rectified outputs are then measured by respective voltmeters 78–81. The lowest frequency filter to activate its meter is then determinable by direct observation. Of course, the rectifier outputs may be coupled to a variety of other indicator devices or utilization circuits to make this determination automatically. In any event, the individual rectifier outputs represent distant ranges corresponding to the respective lock-in zones. The significant output is the one corresponding to the lowest subharmonic.

In operation of the device of FIGURE 7, it may be assumed that the transceiver locks itself in during the Kth pulse. The general pulse pattern then consists of a repetition of a basic group of K arbitrary pulses with every other group having either the same phase (no phase reversal in the echo path) or opposite phase (phase reversal in the echo path). Generally speaking, there will be present in the oscillatory signal from oscillator 10 the Kth quench frequency subharmonic with no phase reversal or the 2Kth subharmoic with phase reversal. There are, however, particular pulse sequences in the basic group such that either the 2Kth or the Kth subharmonic is missing. Consequently, the developed information can be somewhat ambiguous in certain circumstances.

However, the ambiguity can be resolved by effectively biasing the transceiver so that in the absence of an echo a series of pulses of constant phase is transmitted. This may be accomplished simply by adjusting the signal amplitude from quenching device 16 (such as from pulse generator 36 in FIGURE 1*a*) so that the oscillator is not completely quenched but there is instead a small carry-over of energy from each previous quench cycle. To the same effect, a small amount of energy may be allowed to carry over by other means, such as by permitting a small amount of reverse-direction flow through unilateral translator 38. It may be noted that incomplete quenching sets a threshold for reception. However, this can be made to be of about the order of circuit noise. The "biased" transceiver responds to a phase-reversing echo in the Kth lock-in zone by creating a pulse stream exhibiting a very strong 2Kth subharmonic of the quench frequency. It is this information which is read out upon feeding the synchronous detector output to a series of narrow-band filters as described.

In accordance with still another aspect of the present invention, oscillator 10 is utilized as a command receiver for a plurality of channels. This may be understood by assuming a signal picked up by antenna 12 of a frequency $f+\Delta f$, where, as before, $f$ is the basic oscillator frequency. The pulse pattern of the oscillator under these conditions is depicted in FIGURE 8 and it has a corresponding frequency spectrum as shown in FIGURE 9. The spectrum of the resultant oscillatory energy consists of subsidebands of the difference frequency spaced about the carrier and quench frequency sub-carriers, although the carrier frequency and the quench frequency sub-carriers themselves are absent. To obtain the signal information $\Delta f$, any of several approaches may be employed. In one specific form, the selector-detector network of FIGURE 5*b* is utilized in the combination of FIGURE 1. Synchronous detector 66 together with integrator 68–69, which has a time constant long compared to the period of the oscillations, extracts and detects the energy contained in the subsidebands of the spectrum of the quenched oscillations to directly develop the output signal $\Delta f$. Alternatively, narrow-band filtering together with rectification at any of the quench frequency subsidebands $f \pm nf_q$ yields an output signal representative of $2\Delta f$. Thus, the selector and detector network of FIGURE 2 is in this case utilized with filter 39 being tuned to the subsideband frequency.

There have been disclosed several different combinations, each of which takes unique advantage of certain properties of a super-regenerative oscillator capable of either one of two counterphases of oscillation. When employed in combination with networks to select and extract subsideband energy present in the spectrum of the signal oscillations, the combination is useful as a radar transmitter to determine the speed of a moving object. Simultaneously, or alternatively, the basic oscillator is utilized in combination with a network to extract and detect the lowest quench frequency subharmonic in order to provide distance information with respect to the object or target. In still another field of application, and if desired with essentially the same circuitry, the combination permits the reception and detection of a plurality of different channels, as in a command receiver. While the discussion has assumed, for purposes of explanation, the utilization of an antenna 12 in conjunction with energy-transmission thereby of radio frequency energy, it will be apparent that the apparatus is not restricted to any particular frequency range. Antenna 12 could as well be replaced by an acoustical transducer and the operation of the circuitry conducted at audio or supersonic frequencies.

While particular embodiments of the invention have been shown and described, it will be obvious to those skilled in the art that changes and modifications may be made without departing from the invention in its broader aspects, and, therefore, the aim in the appended claims is to cover all such changes and modifications as fall within the true spirit and scope of the invention.

I claim:

1. Wave-signal apparatus comprising:
an oscillator which develops oscillations at a predetermined frequency in either of two counterphases dependent upon the phase of initial oscillations;
means coupled to said oscillator for periodically quenching said oscillations;
means coupled to said oscillator for supplying oscillatory energy thereto;
and means coupled to said oscillator for extracting and detecting energy contained in a sub-sideband of the spectrum of the quenched oscillations.

2. Wave-signal apparatus comprising:
an oscillator which develops oscillations at a predetermined frequency $f$ in either of two counterphases dependent upon the phase of initial oscillations;
means coupled to said oscillator for quenching said oscillations at a quench frequency $f_q$;
means coupled to said oscillator for supplying oscillatory energy thereto;
and means coupled to said oscillator for extracting and detecting energy contained in a sub-sideband of the spectrum of the quenched oscillations at a frequency $f \pm nf_q/2$, where $n$ is any integer including zero.

3. A wave-signal receiver comprising:
an oscillator which develops oscillations at a predetermined frequency $f$ in either of two counterphases dependent upon the phase of initial oscillations;
means coupled to said oscillator for quenching said oscillations at a quench frequency $f_q$;
means coupled to said oscillator for supplying oscillatory energy thereto having a frequency $f+\Delta f$;
and means coupled to said oscillator for extracting and detecting energy contained in a sub-sideband of the spectrum of the quenched oscillations at a frequency $f \pm nf_q$, where $n$ is any integer including zero, to develop an output signal having a frequency $N\Delta f$, where N is an integer.

4. A wave-signal receiver comprising:
an oscillator which develops oscillations at a predetermined frequency in either of two counterphases dependent upon the phase of initial oscillations;
means coupled to said oscillator for periodically quenching said oscillations;
means coupled to said oscillator for supplying oscillatory energy thereto;
and means, including a synchronous detector coupled to said oscillator and having an output time constant long compared to the period of said oscillations, for extracting and detecting energy contained in a sub-sideband in the spectrum of the quenched oscillations adjacent said predetermined frequency.

5. A wave-signal receiver comprising:
an oscillator which develops oscillations at a predetermined frequency $f$ in either of two counterphases dependent upon the phase of initial oscillations;
means coupled to said oscillator for quenching said oscillations at a quench frequency $f_q$;
means coupled to said oscillator for supplying oscillatory energy thereto having a frequency $f+\Delta f$;
a narrow-band filter coupled to said oscillator and having an acceptance band for any one of the frequencies $f \pm nf_q$, where $n$ is an integer, for extracting sub-sideband energy contained in the spectrum of the quenched oscillations;
and rectification means coupled to said filter for detecting the extracted energy to develop an output signal having a frequency $2\Delta f$.

6. A wave-signal receiver comprising:
a parametric subharmonic oscillator responsive to pump signals at a frequency $2f$ to develop oscillations at a frequency $f$;
a source of pump signals of frequency $2f$ coupled to said oscillator;
means coupled to said oscillator for periodically quenching said oscillations;
means coupled to said oscillator for supplying oscillatory energy thereto;
and means coupled to said oscillator for extracting and detecting energy contained in a sub-sideband of the spectrum of the quenched oscillations.

7. Wave-signal apparatus comprising:
an oscillator which develops oscillations at a predetermined frequency in either of two counterphases dependent upon the phase of initial oscillations;
means coupled to said oscillator for periodically quenching said oscillations;
means coupled to said oscillator for supplying oscillatory energy thereto;
means for extracting and detecting energy contained in a sub-sideband of the spectrum of the quenched oscillations;
and uni-directional signal translation means coupling said extracting and detecting means to said oscillator for delivering the quenched oscillatory energy from the latter to the former.

8. A wave-signal system for determining characteristics of an object spaced therefrom, comprising:
an oscillator which develops oscillations at a predetermined frequency in either of two counterphases dependent upon the phase of initial oscillation;
signal-transmission means coupled to said oscillator for translating energy from said oscillations between said oscillator and the object;
means coupled to said oscillator for quenching said oscillations to establish an oscillatory pulse duration $T_d$ with a quench period $T_q$ such that $$NT_q - T_d < \tau < NT_q$$

where $\tau$ is the echo time delay of said oscillations between said signal-transmission means and the object and where N is an integer;

and means coupled to said oscillator for extracting and detecting sideband energy in the spectrum of the quenched oscillations.

9. A wave-signal system for determining characteristics of an object spaced therefrom, comprising:

an oscillator which develops oscillations at a predetermined frequency in either of two counterphases dependent upon the phase of initial oscillation;

signal-transmission means coupled to said oscillator for translating energy from said oscillations between said oscillator and the object;

means coupled to said oscillator for quenching said oscillations to establish an oscillatory pulse duration $T_d$ with a quench period $T_q$ such that $$NT_q - T_d < \tau < NT_q$$

where $\tau$ is the echo time delay of said oscillations between said signal-transmission means and the object and where N is an integer;

and means coupled to said oscillator for extracting and detecting sub-sideband energy in the spectrum of the quenched oscillations.

10. A wave-signal system for determining characteristics of an object spaced therefrom, comprising:

an oscillator which develops oscillations at a predetermined frequency in either of two counterphases dependent upon the phase of initial oscillation;

signal-transmission means coupled to said oscillator for translating energy from said oscillations between said oscillator and the object;

means coupled to said oscillator for quenching said oscillations to establish an oscillatory pulse duration $T_d$ with a quench period $T_q$ such that $$NT_q - T_d < \tau < NT_q$$

where $\tau$ is the echo time delay of said oscillations between said signal-transmission means and the object and where N is an integer;

means coupled to said oscillator for extracting and detecting sub-sideband energy in the spectrum of the quenched oscillations;

and means coupled to said oscillator for extracting and detecting the lowest quench frequency sub-harmonic present with said quenched oscillations.

11. A wave-signal system for determining characteristics of an object spaced therefrom, comprising:

an oscillator which develops oscillations at a predetermined frequency in either of two counterphases dependent upon the phase of initial oscillation;

signal-transmission means coupled to said oscillator for translating energy from said oscillations between said oscillator and the object;

means coupled to said oscillator for quenching said oscillations to establish an oscillatory pulse duration $T_d$ with a quench period $T_q$ such that $$NT_q - T_d < \tau < NT_q$$

where $\tau$ is the echo time delay of said oscillations between said signal-transmission means and the object and where N is an integer;

and means coupled to said oscillator for extracting and detecting the lowest quench frequency sub-harmonic present with said quenched oscillations.

12. A wave-signal system for determining characteristics of an object spaced therefrom, comprising:

an oscillator which develops oscillations at a predetermined frequency in either of two counterphases dependent upon the phase of initial oscillation;

signal-transmission means coupled to said oscillator for translating energy from said oscillations between said oscillator and the object;

means coupled to said oscillator for quenching said oscillations to establish an oscillatory pulse duration $T_d$ with a quench period $T_q$ such that $NT_q - T_d < \tau < NT_q$, where $\tau$ is the echo time delay of said oscillations between said signal-transmission means and the object and where N is an integer;

means for extracting quench-frequency sideband energy in the spectrum of the quenched oscillations;

and means, including a plurality of narrow-band filters individually having acceptance bands at respective ones of the quench frequency sub-harmonics including the the lowest such sub-harmonic together with means for individually rectifying the output signals from said filters, coupled to said extracting means for developing an output signal indicative of distance between the object and said signal-transmission means.

13. A wave-signal system for determining characteristics of an object spaced therefrom, comprising:

an oscillator which develops oscillations at a predetermined frequency in either of two counterphases dependent upon the phase of initial oscillation;

signal-transmission means coupled to said oscillator for translating energy from said oscillations between said oscillator and the object;

means coupled to said oscillator for quenching said oscillations to establish an oscillatory pulse duration $T_d$ with a quench period $T_q$ such that $NT_q - T_d < \tau < NT_q$, where $\tau$ is the echo time delay of said oscillations between said signal-transmission means and the object and where N is an integer;

a narrow band filter coupled to said oscillator and having a passband receptive to one of the quench frequency sidebands in the spectrum of the quenched oscillations;

and means coupled to said filter for rectifying its output signal to develop object-motion Doppler frequency information.

14. A wave-signal system for determining characteristics of an object spaced therefrom, comprising:

an oscillator which develops oscillations at a predetermined frequency in either of two counterphases dependent upon the phase of initial oscillation;

signal-transmission means coupled to said oscillator for translating energy from said oscillations between said oscillator and the object;

means coupled to said oscillator for quenching said oscillations to establish an oscillatory pulse duration $T_d$ with a quench period $T_q$ such that $NT_q - T_d < \tau < NT_q$, where $\tau$ is the echo time delay of said oscillations between said signal-transmission means and the object and where N in an integer;

a narrow band filter coupled to said oscillator and having a passband receptive to one of the quench frequency sidebands in the spectrum of the quenched oscillations, the width of said passband being less than the quench frequency but greater than a predetermined maximum Doppler frequency;

and means coupled to said filter for rectifying its output to develop object-motion Doppler frequency information.

15. A wave-signal system for determining characteristics of an object spaced therefrom, comprising:

an oscillator which develops oscillations at a predetermined frequency in either of two counterphases dependent upon the phase of initial oscillation;

signal-transmission means coupled to said oscillator for translating energy from said oscillations between said oscillator and the object;

means coupled to said oscillator for quenching said oscillations to establish an oscillatory pulse duration $T_d$ with a quench period $T_q$ such that $$NT_q - T_d < \tau < NT_q,$$

where $\tau$ is the echo time delay of said oscillations between said signal-transmission means and the object and where N in an integer;

a plurality of narrow band filters coupled to said oscillators and individually having passbands receptive to different ones of the quench-frequency and half-quench frequency sidebands in the spectrum of the quenched oscillations;

a plurality of rectifiers coupled individually to said filters for detecting the respective different output signals derived by the filters;

and means for subtracting the additive combination of the detected output signals derived from the half-quench-frequency sidebands from the additive combination of the detected output signals derived from the quench-frequency sidebands.

16. A wave-signal system for determining characteristics of an object spaced therefrom, comprising:

an oscillator which develops oscillations at a predetermined frequency in either of two counterphases dependent upon the phase of initial oscillation;

signal-transmission means coupled to said oscillator for translating energy from said oscillations between said oscillator and the object;

means coupled to said oscillator for quenching said oscillations to establish an oscillatory pulse duration $T_d$ with a quench period $T_q$ such that $NT_q - T_d < \tau < NT_q$, where $\tau$ is the echo time delay of said oscillations between said signal-transmission means and the object and where N in as integer;

and means, including a synchronous detector coupled to said oscillator and having an output time constant long compared to the period of said oscillations, for extracting and detecting energy contained in a sub-sideband in the spectrum of the quenched oscillations adjacent to said predetermined frequency.

17. A wave-signal system for determining characteristics of an object spaced therefrom, comprising:

an oscillator which develops oscillations at a predetermined frequency in either of two counterphases dependent upon the phase of initial oscillation;

signal-transmission means coupled to said oscillator for translating energy from said oscillations between said oscillator and the object;

means coupled to said oscillator for quenching said oscillations to establish an oscillatory pulse duration $T_d$ with a quench period $T_q$ such that $$NT_q - T_d < \tau < NT_q$$

where $\tau$ is the echo time delay of said oscillations between said signal-transmission means and the object and where N is an integer;

and means coupled to said oscillator and responsive to sideband energy of the quenched oscillations for detecting object-motion Doppler frequency energy.

18. A wave-signal system for determining characteristics of an object spaced therefrom, comprising:

a parametric sub-harmonic oscillator responsive to pump signals at a frequency $2f$ to develop oscillations at a frequency $f$;

a source of pump signals of frequency $2f$ coupled to said oscillator;

signal-transmission means coupled to said oscillator for translating energy from said oscillations between said oscillator and the object;

means coupled to said oscillator for quenching said oscillations to establish an oscillatory pulse duration $T_d$ with a quench period $T_q$ such that $NT_q - T_d < \tau < NT_q$, where $\tau$ is the echo time delay of said oscillations between said signal-transmission means and the object and N is an integer;

and means coupled to said oscillator for extracting and detecting sideband energy in a spectrum of the quenched oscillations.

19. A wave-signal system for determining characteristics of an object spaced therefrom, comprising:

an oscillator which develops oscillations at a predetermined frequency in either of two counterphases dependent upon the phase of initial oscillation;

signal-transmission means coupled to said oscillator for translating energy from said oscillations between said oscillator and the object;

means coupled to said oscillator for quenching said oscillations to establish an oscillatory pulse duration $T_d$ with a quench period $T_q$ such that $$NT_q - T_d < \tau < NT_q$$

where $\tau$ is the echo time delay of said oscillations between said signal-transmission means and the object and where N is an integer;

means for extracting and detecting sideband energy in the spectrum of the quenched oscillations;

and uni-directional signal translating means coupling said extracting and detecting means to said oscillator for delivering the quenched oscillatory energy from the latter to the former.

20. A wave-signal system for determining characteristics of an object spaced therefrom, comprising:

an oscillator which develops oscillations at a predetermined frequency in either of two counterphases dependent upon the phase of initial oscillation;

signal-transmission means coupled to said oscillator for translating energy from said oscillations between said oscillator and the object;

means coupled to said oscillator for substantially quenching said oscillations to establish an oscillatory pulse duration $T_d$ with a quench period $T_q$ such that $NT_q - T_d < \tau < NT_q$, where $\tau$ is the echo time delay of said oscillations between said signal-transmission means and the object and where N is an integer, the degree of quenching being sufficient to permit only a small amplitude of oscillations between quench cycles as compared with the maximum oscillation amplitude;

and means coupled to said oscillator for extracting and detecting the lowest quench frequency sub-harmonic present with said quenched oscillations.

21. A wave-signal system for determining characteristics of an object spaced therefrom, comprising:

an oscillator which develops oscillations at a predetermined frequency in either of two counterphases dependent upon the phase of initial oscillation;

signal-transmission means coupled to said oscillator for translating energy from said oscillations between said oscillator and the object;

means coupled to said oscillator for at least substantially quenching said oscillations to establish an oscillatory pulse duration $T_d$ with a quench frequency $T_q$ such that $NT_q - T_d < \tau < NT_q$, where $\tau$ is the echo time delay of said oscillations between said signal-transmission means and the object and N is an integer;

means biasing the action of said oscillator to effect development of a series of constant-phase pulses in the absence of a signal received by said signal-transmission means;

and means coupled to said oscillator for extracting and detecting the lowest quench frequency sub-harmonic present with said quenched oscillations.

22. A wave-signal system for determining characteristics of an object spaced therefrom, comprising:

an oscillator which develops oscillations at a predetermined frequency in either of two counterphases dependent upon the phase of initial oscillation;

signal-transmission means coupled to said oscillator for translating energy from said oscillations between said oscillator and the object, an echo received from said object exhibiting a Doppler frequency;

means coupled to said oscillator for quenching said oscillations to establish an oscillatory pulse duration $T_d$ with a quench period $T_q$ such that $$NT_q - T_d < \tau < NT_q$$

where $\tau$ is the echo time delay of said oscillations between said signal-transmission means and the object and where N is an integer, the quench frequency being larger than said Doppler frequency;

and means coupled to said oscillator for extracting and detecting sub-sideband energy in the spectrum of the quenched oscillations.

23. A wave-signal system for determining characteristics of an object spaced therefrom, comprising:

an oscillator which develops oscillations at a predetermined frequency in either of two counterphases dependent upon the phase of initial oscillation;

signal-transmission means coupled to said oscillator for translating energy from said oscillations between said oscillator and the object;

means coupled to said oscillator for quenching said oscillations to establish an oscillatory pulse duration $T_d$ with a quench period $T_q$ such that $$NT_q - T_d < \tau < NT_q$$

where $\tau$ is the echo time delay of said oscillations between said signal-transmission means and the object and where N is an integer;

converting means coupled to said oscillator for converting the oscillatory energy to an intermediate frequency;

a narrow band filter coupled to said converting means and having a passband receptive to one of the converted quench-frequency sidebands in the spectrum of the quenched oscillations;

and means coupled to said filter for rectifying its output signal to develop object-motion Doppler frequency information.

24. A wave-signal system for determining characteristics of an object spaced therefrom, comprising:

an oscillator which develops oscillations at a predetermined frequency in either of two counterphases dependent upon the phase of initial oscillation;

signal-transmission means coupled to said oscillator for translating energy from said oscillations between said oscillator and the object;

means coupled to said oscillator for quenching said oscillation to establish an oscillatory pulse duration $T_d$ with a quench period $T_q$ such that $T_q - T_d < \tau < T_q$, where $\tau$ is the echo time delay of said oscillations between said signal-transmission means and the object;

and means coupled to said oscillator for extracting and detecting sideband energy in the spectrum of the quenched oscillations.

References Cited by the Examiner

UNITED STATES PATENTS 2,977,482 3/1961 Sterzer ______________ 307—88

OTHER REFERENCES

Skolnik, Introduction to Radar Systems, New York, McGraw-Hill Book Company, 1962, page 375.

CHESTER L. JUSTUS, *Primary Examiner.*

R. D. BENNETT, *Assistant Examiner.*